US009773063B2

(12) United States Patent
Shi et al.

(10) Patent No.: US 9,773,063 B2
(45) Date of Patent: Sep. 26, 2017

(54) REAL-TIME ONLINE-LEARNING OBJECT RECOMMENDATION ENGINE

(75) Inventors: Yanxin Shi, Palo Alto, CA (US); Andrey Goder, San Jose, CA (US); David Ye, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 383 days.

(21) Appl. No.: 13/313,984

(22) Filed: Dec. 7, 2011

(65) Prior Publication Data

US 2013/0151539 A1 Jun. 13, 2013

(51) Int. Cl.
*G06F 17/30* (2006.01)

(52) U.S. Cl.
CPC .............. *G06F 17/30867* (2013.01)

(58) Field of Classification Search
CPC ........... G06Q 30/0269; G06Q 30/0255; G06Q 50/01; G06F 17/30828; G06F 17/30867; G06F 17/30699
USPC ....... 707/722, 736, 999.001; 705/14.49, 14.4
See application file for complete search history.

(56) References Cited

U.S. PATENT DOCUMENTS

| | | | |
|---|---|---|---|
| 7,853,622 B1 * | 12/2010 | Baluja et al. ................. | 707/803 |
| 8,666,980 B1 * | 3/2014 | Vora ............................. | 707/732 |
| 2008/0077574 A1 * | 3/2008 | Gross ............................. | 707/5 |
| 2008/0172461 A1 * | 7/2008 | Thattai et al. ................ | 709/204 |
| 2008/0214148 A1 * | 9/2008 | Ramer et al. ............... | 455/414.1 |
| 2009/0313295 A1 * | 12/2009 | Blaxland et al. ......... | 707/103 R |
| 2011/0143731 A1 * | 6/2011 | Ramer et al. ............... | 455/414.1 |
| 2011/0143733 A1 * | 6/2011 | Ramer et al. ............... | 455/414.1 |
| 2011/0145719 A1 * | 6/2011 | Chen et al. .................... | 715/739 |
| 2011/0153412 A1 * | 6/2011 | Novikov et al. ............ | 705/14.42 |
| 2011/0153421 A1 * | 6/2011 | Novikov et al. ............ | 705/14.52 |
| 2011/0153428 A1 * | 6/2011 | Ramer et al. ............... | 705/14.64 |
| 2011/0184813 A1 * | 7/2011 | Barnes et al. .............. | 705/14.66 |
| 2011/0191352 A1 * | 8/2011 | Jones et al. .................... | 707/749 |
| 2012/0001919 A1 * | 1/2012 | Lumer ......................... | 345/440 |
| 2012/0078981 A1 * | 3/2012 | Gradin et al. ................ | 707/812 |
| 2012/0079004 A1 * | 3/2012 | Herman ........................ | 709/203 |
| 2012/0259915 A1 * | 10/2012 | Bhatt et al. .................... | 709/204 |
| 2013/0013418 A1 * | 1/2013 | Novikov et al. ............ | 705/14.66 |
| 2013/0080523 A1 * | 3/2013 | Rubinstein et al. .......... | 709/204 |

* cited by examiner

*Primary Examiner* — Dennis Truong
(74) *Attorney, Agent, or Firm* — Baker Botts L.L.P.

(57) ABSTRACT

In one embodiment, a system includes one or more computing systems that implement a social networking environment containing a large number of heterogeneous objects type, each of the plurality of object types having varying features, the system implementing a generic object recommendation engine for scoring objects and recommending the objects to users of the social networking system. In particular embodiments, the user and content object features are fed as inputs into a heuristic model that generates an expected value for the content object and user. In particular embodiments, the object recommendation engine includes an online learner that may log a user's actions after the initial impression to determine the relatively degree of interest to the user.

19 Claims, 7 Drawing Sheets

REAL-TIME ONLINE-LEARNING OBJECT RECOMMENDATION ENGINE

TECHNICAL FIELD

This disclosure relates generally to the field of social networking.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view "profile" pages created or customized by other users where visibility and interaction with such profiles by other users is governed by some characteristic set of rules. By way of example, a user profile may include such user-declared information as contact information, background information, job/career information, as well as interests.

A traditional social network is a social structure made of individuals, groups, entities, or organizations generally referred to as "nodes," which are tied (connected) by one or more specific types of interdependency. Social network (graph) analysis views social relationships in terms of network theory consisting of nodes and edges. Nodes are the individual actors within the networks, and edges are the relationships between the actors. The resulting graph-based structures are often very complex. There can be many kinds of edges between nodes. In its simplest form, a social network, or social graph, is a map of all of the relevant edges between all the nodes being studied.

BRIEF DESCRIPTION OF THE DRAWINGS

FIG. 2 illustrates an example profile page including recommended objects.

FIG. 2A illustrates another example profile page including recommended objects.

DESCRIPTION OF EXAMPLE EMBODIMENTS

Figure 1:
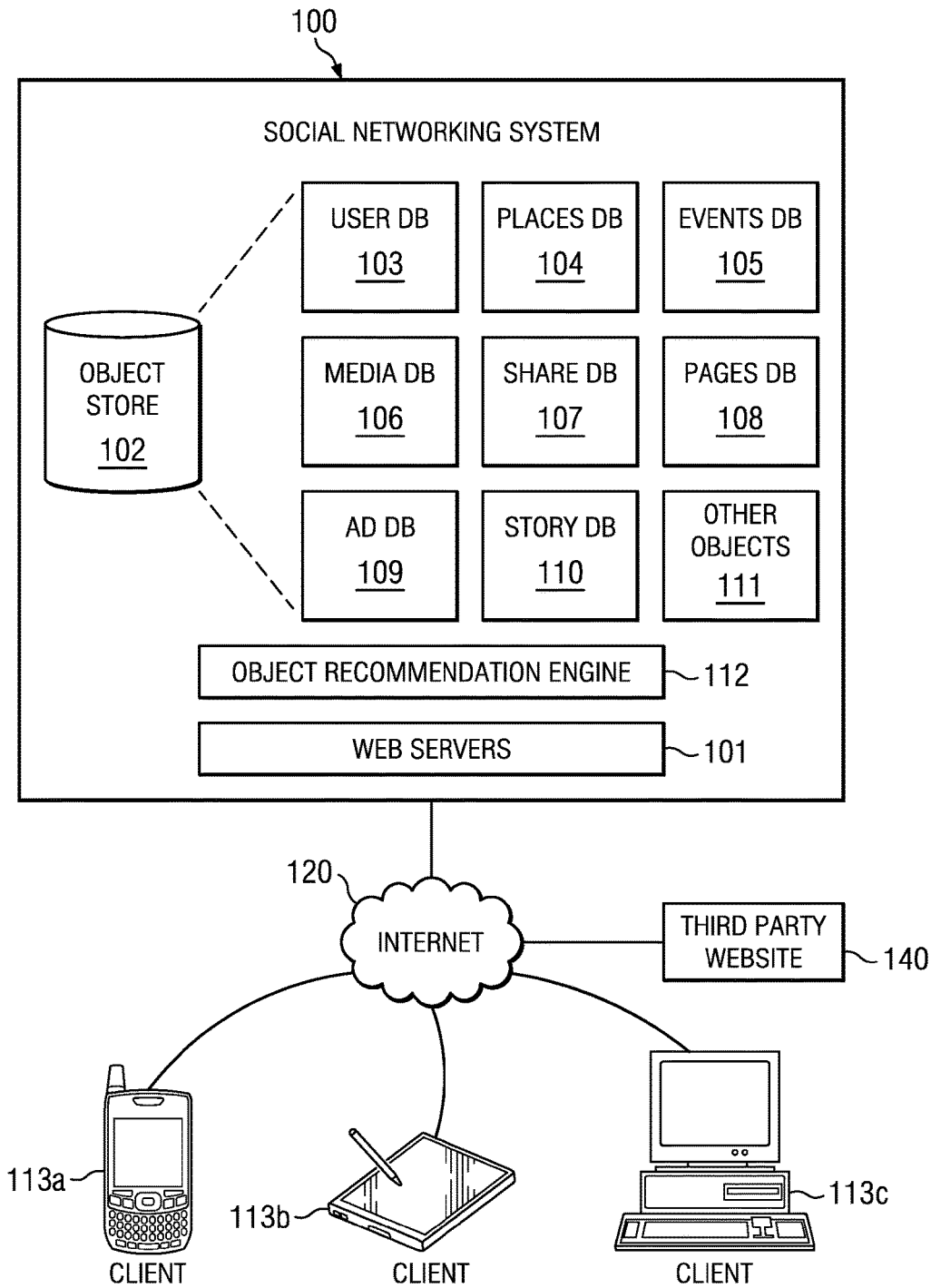
FIG. 1 illustrates an example computer network environment of an example social network environment.

Particular embodiments relate to a social network environment that includes an infrastructure or platform (hereinafter infrastructure and platform may be used interchangeably) enabling an integrated social network environment. In this disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. The social network utilizes a social graph that includes nodes representing users and concepts in the social network environment as well as edges that define or represent connections between such nodes. In particular embodiments, any object within the social networking system or node within the social graph may be ranked or scored via a recommendation engine that predicts the expected value of the object or node to the user. Particular embodiments relate to presenting objects or nodes to a particular user that maximize the expected value of the entire system.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment. In particular embodiments, the social graph information further includes a plurality of edges that each define or represent a connection between a corresponding pair of nodes in the social graph.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. For example a place, business, or brand may be represented on the social graph by a concept node and its corresponding hub page, and users may make connections to the concept node via an expression of affinity, such as a "like", commenting on the hub page, an expression that the user was physically at the location by "checking in," and the like. Such connections may be represented, in particular embodiments, by edges connecting the user node to the concept node. As another example, events may be represented by a node on a social graph, and users may broadcast their intent to attend the event through an RSVP edge.

In particular embodiments, any piece of content on the social networking system may be considered an object or a node in the social graph. For example, the individual status updates a member writes, or the photos in his or her albums, may each be an object in the social graph. In particular embodiments, objects in the social graph may be "open", meaning third-party developers may utilize an application programming interface to generate custom object types, as well as custom actions that users may perform on the objects, in the social graph.

In particular embodiments, the social networking system may make object recommendations to users browsing the social networking web site. Particular embodiments relate to utilizing a real-time online learning object recommendation engine to rank particular content objects based on their expected interest level to a particular user, and render the most interesting objects to users. In particular embodiments, the recommendation engine possesses an online learning component that logs whether a user converts, or acts upon, a particular content object after the initial display, or impression, and updates the recommendation engine substantially in real time with the conversion or lack thereof.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied. As just described, in various example embodiments, one or more described web pages or web applications are associated with a social network environment or social networking service.

Particular embodiments may operate in, or in conjunction with, a wide area network environment, such as the Internet, including multiple network addressable systems. FIG. 1 illustrates an example network environment, in which various example embodiments may operate. Internet 120 generally represents one or more interconnected networks, over which various systems and hosts described herein may communicate. Internet 120 may include packet-based wide area networks (such as the Internet), private networks, wireless networks, satellite networks, cellular networks, paging networks, and the like. As FIG. 1 illustrates, particular embodiments may operate in conjunction with a network environment comprising social network system 100 and client devices 113a-c, as well as, in some embodiments, one or more third party web application servers 140. Client devices 113a-c, web servers 40, and third-party websites 140 may be operably connected to the network environment and Internet 120 via a network service provider, a wireless carrier, a set of routers or networking switches, or any other suitable means.

Each client device 113 may generally be a computer, computing system, or computing device including functionality for communicating (e.g., remotely) over a computer network. Client device 113 in particular may be a desktop computer 113c, laptop computer, personal digital assistant (PDA), tablet PC 113b, in- or out-of-car navigation system, smart phone 113a or other cellular or mobile device, or mobile gaming device, among other suitable computing devices. Client device 113 may execute one or more client applications, such as a web browser (e.g., MICROSOFT WINDOWS INTERNET EXPLORER, MOZILLA FIREFOX, APPLE SAFARI, GOOGLE CHROME, AND OPERA, etc.), to access and view content over a Internet 120. In particular implementations, the client applications allow a user of client device 113 to enter addresses of specific network resources to be retrieved, such as resources hosted by social networking system 100. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

More particularly, when a user at a client device 113 desires to view a particular web page (hereinafter also referred to as a target structured document) hosted by social networking system 100, and made available in conjunction with social networking system 100, the user's web browser, or other client-side structured document rendering engine or suitable client application, formulates and transmits a request to web servers 101 of social networking system 100. The request generally includes a URL or other document identifier as well as metadata or other information. By way of example, the request may include information identifying the user, such as a user ID, as well as information identifying or characterizing the web browser or operating system running on the user's client computing device 113. The request may also include location information identifying a geographic location of the user's client device or a logical network location of the user's client device, as well as timestamp identifying when the request was transmitted.

In an example implementation, when a request for a web page or structured document hosted by social networking system 100 is received by web servers 101 of social networking system 100, one or more page-generating processes executing within the social networking system 100 typically generates a base web page in the form of a Hyper Text Markup Language (HTML), Extensible Markup Language (XML), or other web browser-supported structured document. The generated structured document is then transmitted in a response, which may comprise one or more portions or partial responses, to the requesting client 113 via a Hypertext Transfer Protocol (HTTP) or other suitable connection for rendering by the web browser at the client device 113. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within social networking system 100 or at one or more external locations, to the client device 113 requesting the web page. Typically, upon receipt of the response, the web browser or other client document rendering application running at the client device 113 then constructs a document object model (DOM) representation of the received structured document and requests the resource(s) (which may be at one or more other external locations) embedded in the document.

In an example implementation, when a registered user of social networking system 100 first requests a web page from social networking system 100 in a given user session, the response transmitted to the user's client device 113 from web servers 101 of social networking system 100 may include a structured document generated by the page-generating process for rendering a login page at the client device. The user may then enter his or her user login credentials (e.g., user ID and password), which are then transmitted from the user's client device 113 to social networking system 100. Upon successful authentication of the user, social networking system 100 may then transmit a response to the user's web browser at the user's client device 113 that includes a structured document generated by the page-generating process for rendering a user homepage or user profile page at the user's client device.

In one example embodiment, social networking system 100 comprises computing systems that allow users at client devices 113 to communicate or otherwise interact with each other and access content, such as user profiles, as described herein. Social networking system 100 is a network addressable system that, in various example embodiments, comprises one or more physical servers as well as one or more data stores. The one or more physical servers are operably connected to Internet 120 via, by way of example, a set of routers or networking switches. In an example embodiment, the functionality hosted by the one or more physical servers may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

The physical servers may host functionality directed to the operations of social networking system 100. By way of example, social networking system 100 may host a website that allows one or more users, at one or more client devices 113, to view and post information, as well as communicate with one another via the website. Hereinafter, the physical servers may be referred to as web server 101, although, as just described, the servers may include numerous servers hosting, for example, social networking system 100, as well as other content distribution servers, data stores, or databases.

The data store may comprise object store 102, which may store content and data relating to, and enabling, operation of the social network environment as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, object store 102 corresponds to one or more of a variety of separate or integrated databases, such as relational databases and object-oriented databases, that maintain information as an integrated collection of logically related records or files stored on one or more physical systems.

In particular embodiments, object store 102 may include a number of databases. For example object store 102 may include user database 103 containing information pertaining to every single user of social networking system 100. In particular embodiments, object store 102 may include places database 104, containing information pertaining to physical locations or businesses represented by concept nodes in social networking system 100. In particular embodiments, users or other node administrators may create event pages for particular real-world events users may attend. Information regarding these events may be stored in events database 105. In particular embodiments, media objects, such as photos, albums, videos, and the like may be stored in media database 106. In particular embodiments, users may share links to other content hosted on third party websites 140 or external application servers. In particular embodiments, each link may be represented by a node on the social graph. In particular embodiments, shared links may be stored as objects within share db 107, or alternatively story database 110. In particular embodiments, each concept node may be represented by a hub page, and both the nodes and pages may be stored in pages database 106. In particular embodiments, individual advertisements may be treated as objects within social networking system 100, and advertisements may be stored in ad db 109. In particular embodiments, individual newsfeed stories, status updates, check-ins, and the like may be stored in story database 110. Finally custom objects defined by third-parties may be stored in other object store 111. Individual databases 103-111 may be located on one or more physical servers. In particular embodiments, individual databases 103-111 may be located in a single server. This disclosure contemplates any suitable means of storing objects of social networking system 100 in any physical configuration.

Structurally, object store 102 may generally include one or more of a large class of data storage and management systems. In particular embodiments, object store 102 may be implemented by any suitable physical system(s) including components, such as one or more database servers, mass storage media, media library systems, storage area networks, data storage clouds, and the like. In one example embodiment, object store 102 includes one or more servers, databases (e.g., MySQL), and/or data warehouses.

Object store 102 may include data associated with different social networking system 100 users, client devices 113, web servers 101 as well as, in particular embodiments, data associated with various concepts. As described above, particular embodiments relate to a social networking system 100 that includes a platform enabling an integrated social network environment. In the following example embodiments, the social network environment may be described or implemented in terms of a social graph including social graph information. In particular embodiments, object store 102 includes a the social graph database in which the social graph information for use in implementing the social network environment described herein is stored. In particular embodiments, the social graph information stored by social networking system 100 in object store 102, and particularly in the social graph database, includes a plurality of nodes and a plurality of edges that define connections between corresponding nodes. In particular embodiments, the nodes or edges themselves are data objects that include the identifiers, attributes, and information (including the information for their corresponding profile pages) for their corresponding users or concepts (as described below), some of which is actually rendered on corresponding profile or other pages. The nodes may also include pointers or references to other objects, data structures, or resources for use in rendering content in conjunction with the rendering of the profile pages corresponding to the respective nodes.

Social networking system 100 may include object recommendation engine 112. Object recommendation engine may determine, for any given user and any given object in object store 102, the expected probability that the particular user may find the object engaging. In particular embodiments, object recommendation engine 112 utilizes a probabilistic model to calculate an expected value for the user. Object recommendation engine 112 is described further with reference to FIG. 3.

Figure 2:
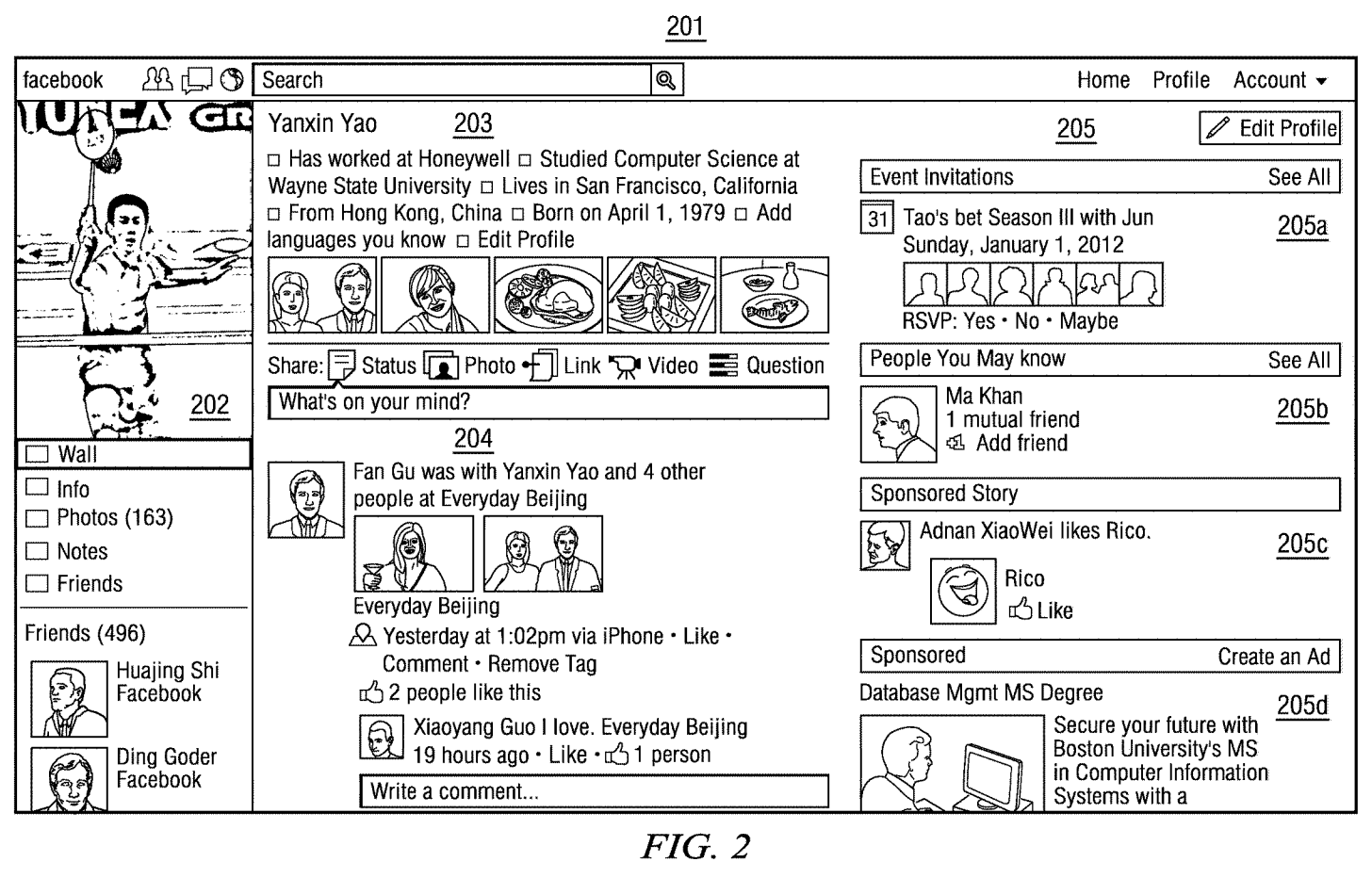
Figure 2A:
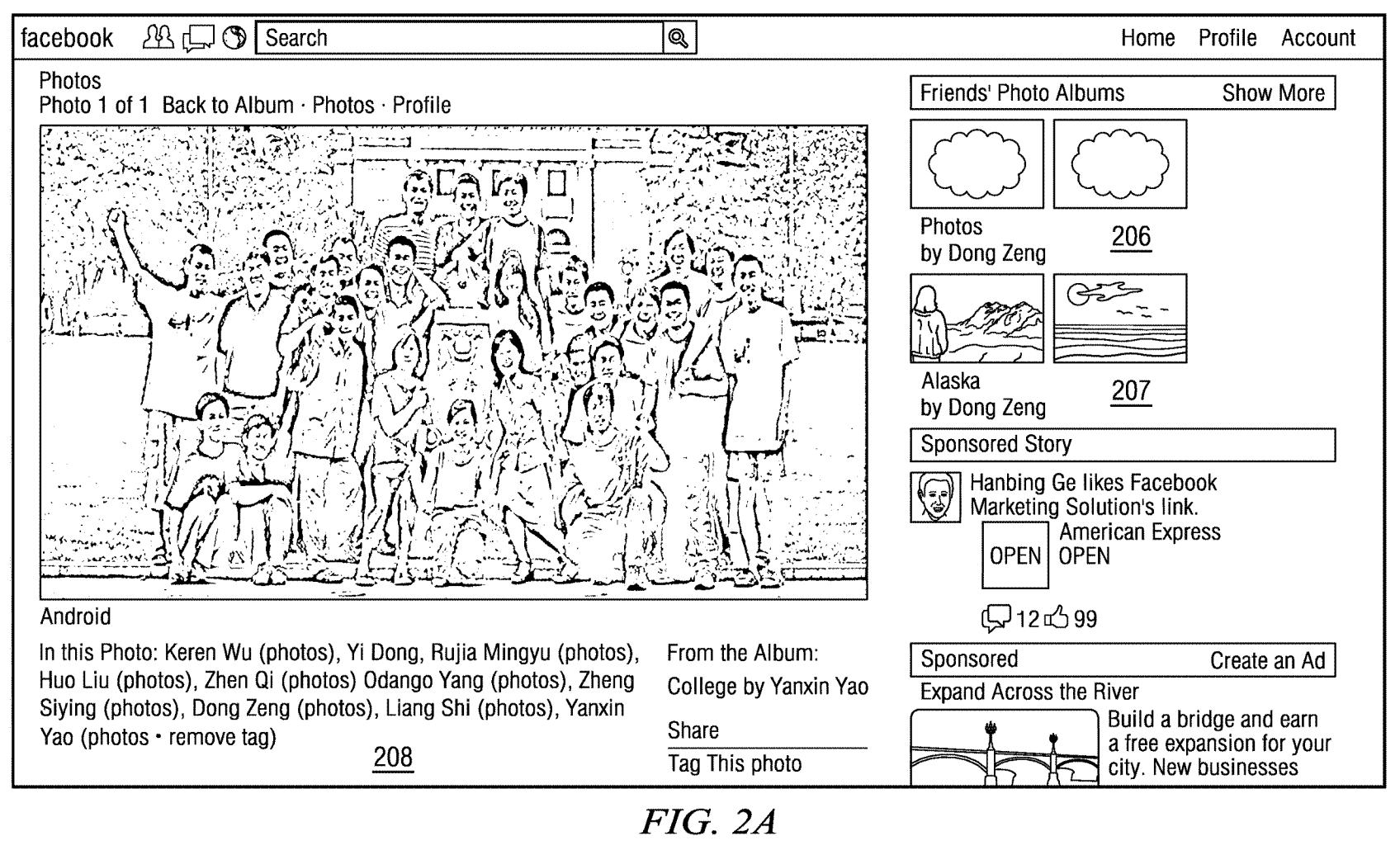

FIGS. 2 and 2A illustrate example profile pages including objects recommended to a particular user by social networking system 100. In FIG. 2, profile page 201 includes multiple elements that are generated by social networking system 100 and delivered to a user's client device 113a-c via web servers 101. Profile page 201 may include, for example, the user's profile picture 202, basic information 203, and a newsfeed 204 of the recent or most interesting activities of the user's connections. In particular embodiments, profile page 201 includes a right-hand column 205 that may include dynamically-generated and user-specific objects for display to the user. For example, right-hand column 205 may include event invitations 205a, a user suggestion object ("people you may know") 205b, sponsored stories 205c, and advertisements 205d. In particular embodiments, each of these elements may be a specific object within social networking system 100 that may be scored and ranked specifically for the user such that the most interesting content is delivered on the right-hand column. For example, when a user is viewing his or her profile page, the user may be most interested in connecting with new users, rather than, for example, browsing his or her existing connections' photo albums. In particular embodiments, social networking system takes into account the user's current page context in determining the type of objects to recommend to the user. Even having filtered the potential objects, for didactic purposes in FIG. 2, to new users, social networking system 100 must determine which users the viewing user will find the most interesting, or, in other words, which users the viewing user is most likely to click on. In particular embodiments, social networking system utilizes a heuristic model based on the viewing user's previous viewing history to calculate an expected value for each user object candidate to be displayed to the viewing user.

FIG. 2A illustrates another example page view having object recommendations 206 and 207. In this example, the viewing user is currently on a specific photo page for one of his first-degree connections. As previously disclosed, social networking system 100 may filter the list of candidate objects based on the currently requested page context. In the example of FIG. 2A, a plurality of individuals are tagged within the viewed photo, including the user "Dong Siying" 208. Because the viewing user has requested a specific photo of one of his friends, social networking system 100 determines the user will be more interested, and therefore more likely to click, photo albums owned by one of the members of the social networking system that is tagged in the viewed photo, and therefore recommends photo albums 206 and 207, owned by "Dong SiYing", to the viewing user in the right-hand column of the currently viewed page. Although FIGS. 2 and 2A display recommended objects on the right-hand column, this disclosure contemplates the display of recommended objects in any portion of the requesting user's display.

Figure 3:
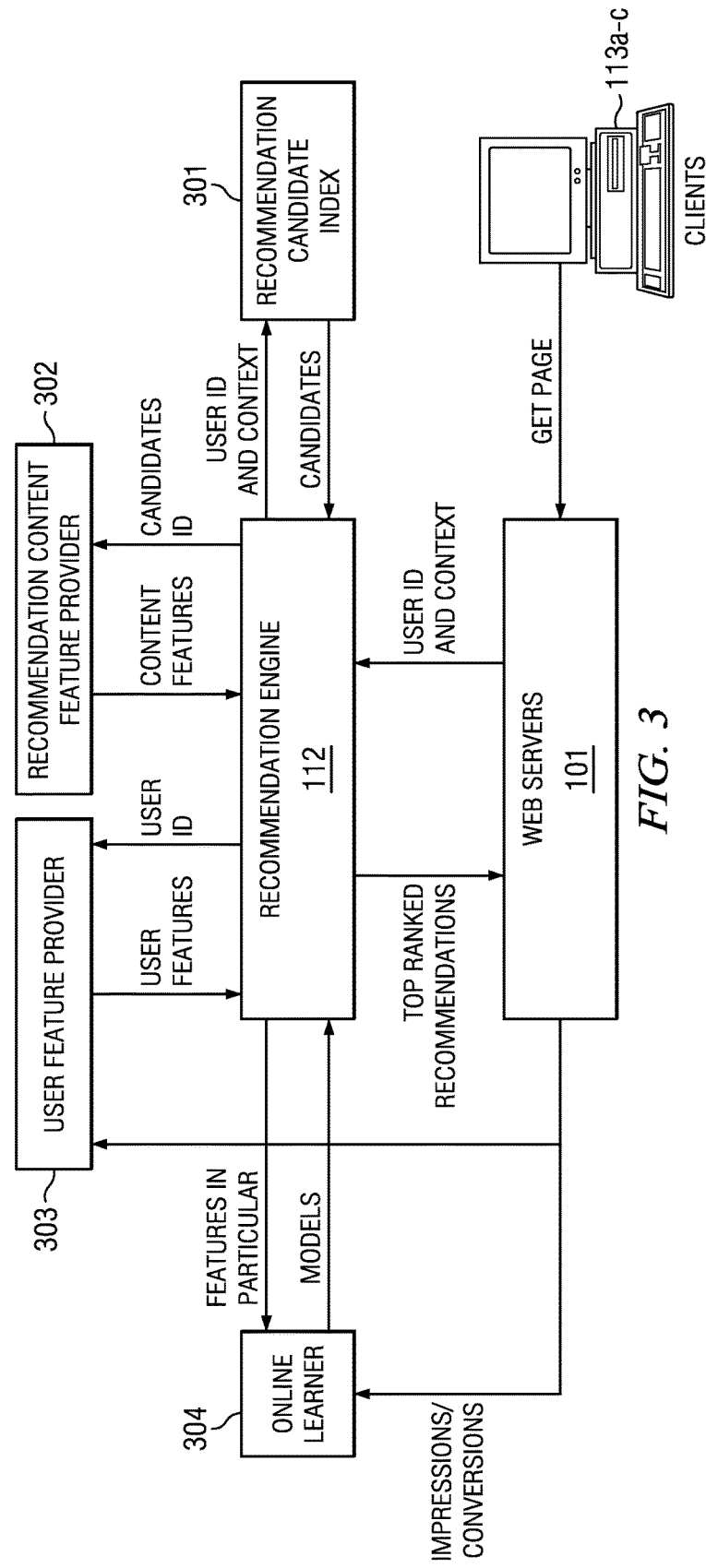
FIG. 3 illustrates an example system architecture for an object recommendation engine in accordance with one embodiment.

FIG. 3 illustrates the system architecture of recommendation engine 112. Recommendation engine 112 is coupled via data connections or network links to web servers 101, recommendation candidate index 301, recommendation content feature provider 302, user feature provider 303, and online learner 304. The various components depicted in FIG. 3 may be housed in separate servers, in the same server, or each individually distributed across multiple servers. In particular embodiments, one or more of the components, for example recommendation content feature provider 302 and user feature provider 303, may be logically or physically collocated with object store 102. FIG. 3 provides a logical system architecture for recommendation engine 112; this disclosure contemplates any physical configuration of servers, applications, or networks implementing recommendation engine 112. FIG. 3 also depicts data exchanges between recommendation engine 112 and the various components of social networking system 100.

When a user at a client device such as 113a-c requests a page from web servers 101, for example, his or her profile page, the web servers transmit data to recommendation engine 112 to request recommended objects to display to the user. In particular embodiments, web servers 101 forward the requesting user's social networking ID and the page ID. The page ID allows recommendation engine 112 to determine the context of the page, for example, whether the user is viewing his or her own profile page, another user's profile page, an event page, a photo page, a hub page, his or her inbox, a specific message thread, or the like. Based on the user ID and page ID, recommendation engine 112, or alternatively recommendation candidate index 301, may determine the people on the page and, in particular embodiments, the people who are the user's friends on the page. In the example of FIG. 2A, when the viewing user requests to view a page including a photo, recommendation candidate index 301 may determine, based on the page ID, the people on the page, and by querying the social graph with the viewing user's ID and the people on the page, may determine the people in the photograph who are also friends with the user. In particular embodiments, recommendation candidate index may filter the objects in object store 102 by this information.

Thus, in particular embodiments, the universe of recommendable objects is filtered by recommendation candidate index 301 based on several factors. First, the objects may be filtered based on page context. For example, if a user is viewing his or her home page or profile, recommendation candidate index may limit the objects to be recommended to other users the viewing user may know. As another example, if the user is viewing a particular other user's profile, the objects may be filtered down to photos of the particular user, or previous status messages by the particular user. Second, the objects may be filtered based on the people contained within the requested page. For example, if the user is viewing a conversation thread with another particular user, recommendation candidate index 301 may limit the objects to be recommended to photos and status updates from that particular user. As another example, if the user is viewing an event page, recommendation candidate index 301 may filter the recommendable objects to other events that the user's friends are attending, or, even more specifically, other events that the user's friends, who are attending the viewed event page, are also attending.

In particular embodiments, candidate recommendation index 301 performs all the cross-referencing of the user ID, page ID, and people contained in the page represented by the page ID, to filter the objects to be recommended to the user. However, given the number of page requests to web servers 101 in a social networking system that may have upwards of 800 million users, particular embodiments contemplate shifting some of the load to web servers 101 to streamline the process. In particular embodiments, web servers 101 transmit a user ID, page ID, and a list of users contained in the page to recommendation engine 112. Web servers 101 may easily parse the requested page to be delivered to the user for the other users contained in the page, thereby obviating the need for recommendation candidate index to retrieve a copy of the requested page and determine the users contained therein.

In particular embodiments, web servers 101 transmit a list of services available for the currently requested page to recommendation engine 112. In such embodiments, services may be specific predetermined algorithms for generating candidate objects. For example, the "people you may know" service may filter the recommendable objects down to user nodes with whom the requesting user shares mutual connections. As another example, the "people you may subscribe to" service may filter the objects to be recommended down to user nodes having public postings that one or more of the viewing user's friends also subscribe to. In particular embodiments, the "events you may attend" service may limit the recommendable objects to events that the viewing user's friends are attending. In particular embodiments, the "photos of this user" service may limit the recommendable objects to photos in which a particular user is tagged. In particular embodiments, the "previous status message" service may limit the recommendable objects to status messages from a particular user. This disclosure contemplates any suitable number or type of service. In particular embodiments, web server 101 accesses a table correlating the requested page type (profile page, message thread, event page, etc.) to one or more services, and transmits the list of services to recommendation engine 112. In particular embodiments, recommendation engine 112 performs this correlation, and web servers 101 merely transmit the page type to recommendation 112. This disclosure contemplates any suitable method of transmitting a list of services to recommendation candidate index 301.

In particular embodiments, recommendation engine 112 parses the requested page contents for keywords for concept extraction. For example, if the user is viewing a message thread, recommendation engine 112 may parse the text of the individual messages to filter the objects to be recommended. For example, if one of the messages discusses "basketball," recommendation engine may submit the concept "basketball" along with the user ID, to recommendation candidate index 301. In response, recommendation candidate index may return photos by the other member of the conversation having implicit edges to the concept "basketball." For example, if the other user owns an album entitled, "Houston Rockets vs. Lakers game," recommendation candidate index 301 may look up the nodes "Houston Rockets" and "Lakers" in the social graph, and determine that they both include implicit edges to the larger concept "basketball", and present the album, or photos in the album, as a recommended object. In particular embodiments, recommendation candidate index may utilize computer vision algorithms to determine whether photos or albums contain implicit edges to concepts. For example, content recommendation index 301 may, in the above example, return images of the other user playing basketball. This disclosure contemplates any suitable means of concept extraction in both the requested page and each individual candidate object.

Regardless of the processing distribution between web server 101, recommendation engine 112, and recommendation candidate index 301, recommendation candidate index 301 eventually returns a list of candidate objects for the user ID and page context. Upon receiving the list of candidates, recommendation candidate index transmits identifiers for the candidate objects to recommendation content feature provider 302, which then returns content features for each of the individual candidates. Content features may comprise, in particular embodiments, the aggregate global statistics, across all users of social networking system 100, for the content object. In particular embodiments, the aggregate statistics may comprise the click-through rate (CTR). In particular embodiments, the click-through rate is the number of times any user clicks on the content object divided by the number of impressions (or displays) to all users. In particular embodiments, the aggregate statistics may be the conversion rate of the content object. In particular embodiments, the "conversion rate" refers to the number of times users of social networking system 100 have, upon clicking on a suggested content object and subsequently being taken to the landing page of the content object, additionally clicked on an element within the landing page, divided by the number of impressions of the content object. The conversion rate is further discussed with reference to FIG. 5. In particular embodiments, the content features include user specific features. For example, when returning the content features for a user object recommendation, recommendation content feature provider 302 may query the social graph to determine the number of mutual friends between the user and the recommended user. In particular embodiments, recommendation engine 112 performs this query. As another example, when the candidate object is a photo, recommendation content feature provider 302 may return the number of people in the photo. In particular embodiments, recommendation content feature provider 302 may utilize computer vision to determine the number of people in a photo.

In particular embodiments, recommendation engine 112 queries user feature provider 303 with the requesting user's ID immediately upon receiving the user ID from web servers 101. User feature provider 303 may return demographic features about the requesting user by looking up the user ID's profile page, or querying the social graph with the user ID for attribute information associated with the node. In particular embodiments, the user features may include, without limitation, the user's age, gender, location, religion, political views, interests, number of friends, ethnicity, occupation, and the like. Any information or attributes that may be determined from user's profile may be a user feature. In particular embodiments, user feature provider 303 may provide an empirical record of the user's historical engagement of particular types of content objects. For example, user feature provider 303 may return the CTR for a user and "people you may know" user objects. In particular embodiments, user feature provider 303 may return the amount of time that has elapsed since the user has been shown a particular content object type. For example, the amount of time since the last display to a user of "previous status messages." This disclosure contemplates any suitable set of user features.

In particular embodiments, after obtaining both user and content features, recommendation engine 112 transmits the features to online learner 304. Online learner 304 returns a model, that is, an array of values of varying weights, that is unique to the set of features for calculation of an expected value of the user/content object combination. In particular embodiments online learner 304 and recommendation engine utilize logistic regression to calculate the weights and expected value. As commonly known in the art, logistic regression models logistic regression model are discriminative classifiers for vectors of fixed dimensionality. In this example, the dimensions are the features. In particular embodiments, the logistic regression model may include derived features with represent non-linear combinations of other input features. In particular embodiments, the nonlinearly is achieved through multiplication, such that the resulting model linear in the derived features, but will no longer be linear in the original features. Although this disclosure describes a system based on logistic regression, any suitable regression analysis may be used. In particular embodiments, online learner 304 and recommendation engine 112 utilize linear regression. In particular embodiments, online learner 304 and recommendation engine 112 utilize nonlinear regression techniques such as ordinary or weighted least squares. In particular embodiments, Bayesian linear regression is utilized. In particular embodiments, online learner 304 and recommendation engine 112 utilize quantile regression. In particular embodiments, online learner 304 and recommendation engine 112 utilize nonparametric regression. This disclosure contemplates any suitable method of calculating the expected value of a user clicking or converting a content object given an input set of user and content features. In particular embodiments, online learner 304 includes a feedback mechanism for updating the model (weights) based on user interaction with rendered content objects. This feedback mechanism is described in further detail with reference to FIG. 5.

Figure 4:
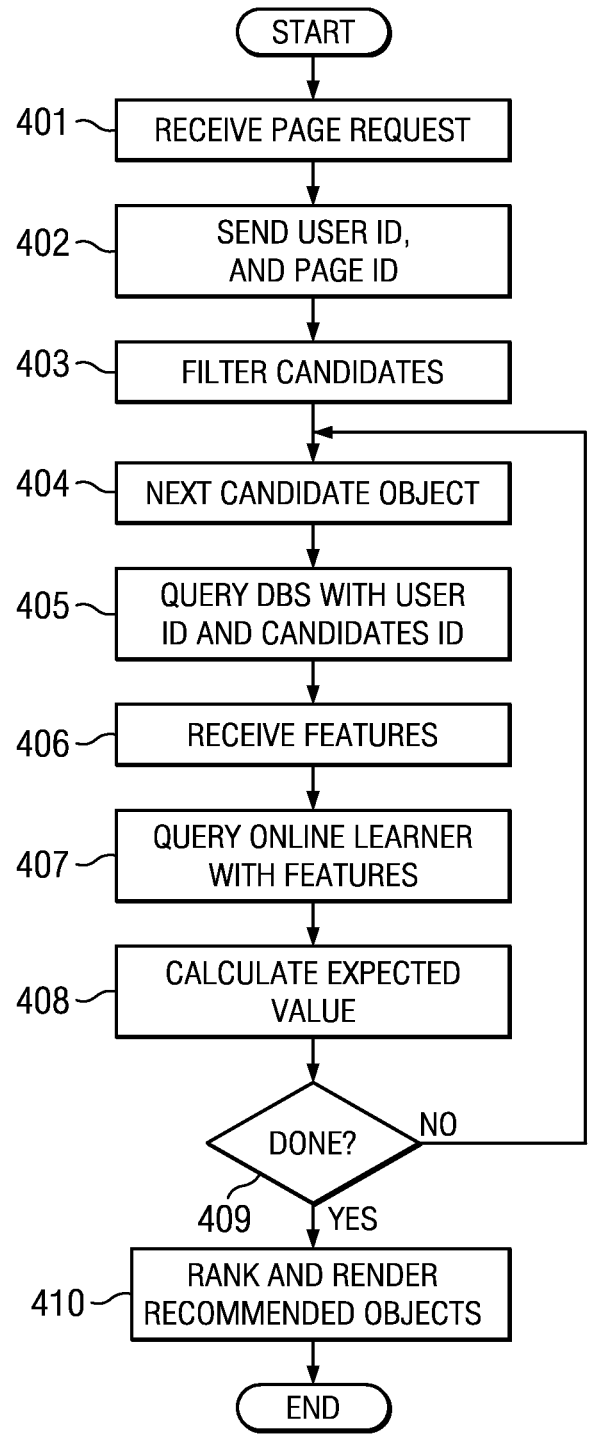
FIG. 4 illustrates an example method for generating recommended objects in response to a request.

FIG. 4 illustrates an example method of generating object recommendations in response to a page request. At Step 401, a user of the social networking system requests a page of content. As previously disclosed, the page may be his or her own profile page, another user's profile page, a photo album, a photo, or the like.

At Step 402, web server 101 forwards a set of information pertaining to the request to recommendation engine 112. As previously disclosed, web servers may send, at a minimum, the requester's user ID and the page ID of the requested page to recommendation engine 112. In particular embodiments, web server 101 may transmit the user ID, page ID, and a list of the users contained in the requested page. In particular embodiments, web server 101 may transmit the user ID, page ID, a list of users contained in the requested page, and a one or more services available on the page. In particular embodiments, recommendation engine 112 may add, remove, or additionally process any of the data passed to it from web servers 101. In particular embodiments, recommendation engine 112 merely passes data from web server 101. At Step 402, recommendation engine 112 transmits, at a minimum, the user ID and page ID to recommendation candidate index 302. In particular embodiments, recommendation engine 112 transmits the user ID and a page context. In particular embodiments, recommendation engine 112 transmits the user ID, page context, and list of users contained in the page. In particular embodiments, recommendation engine 112 transmits the user ID and a list of services available on the page. In particular embodiments, recommendation engine 112 transmits a user ID and a list of the user's friends who are contained in the page. As previously stated, this disclosure contemplates any suitable amount of processing by recommendation engine 112. For didactic purposes, however, this disclosure assumes recommendation engine merely transmits the user ID and page ID received from web server 101.

At Step 403, recommendation candidate index filters the objects to be recommended by the received user ID and page ID. Recommendation candidate index filters the candidates based upon the page context; certain pages may only include certain recommendations according to a set of predetermined filtering rules. Additionally, at Step 403, recommendation candidate index filters the set of objects to be recommended by the user ID and the users contained within the requested page. For example, for a particular page context only objects of a certain type that are owned by friends of the requesting user may be recommended. After filtering the universe of recommendable objects, recommendation candidate index 301 transmits a list of candidates to recommendation engine 112.

At Step 404, recommendation engine 112 selects the next candidate object (the first object, in this case), and begins the process to calculate expected values for each individual candidate object received from recommendation candidate index 301. In particular embodiments, such as FIG. 4, recommendations for individual candidate objects are calculated iteratively, such as in a "for" or "while" loop. In particular embodiments, the individual candidate IDs are transmitted as large vectors or arrays, and all the expected values are calculated in parallel. This disclosure contemplates any suitable method of calculating expected values for a plurality of candidate objects.

At Step 405, upon receiving the list of candidates from recommendation candidate index 301, recommendation engine 112 queries recommendation content feature provider with the candidate ID of the first candidate. Simultaneously, recommendation engine 112 may query user feature provider 303 with the received user ID. In particular embodiments, recommendation engine 112 may query user feature provider immediately upon receiving the user ID from web server 101 (at Step 402).

At Step 406, recommendation engine 112 receives the candidate features and the user features from recommendation content feature provider 302 and user feature provider 303, respectively. In particular embodiments, recommendation engine 112 may store a set of user features and bypass querying user feature provider 303 for the remaining candidate objects in order to reduce network traffic.

At Step 407, recommendation engine 112 queries online learner 304 with the set of user and candidate features. In response, online learner 304 returns an array of weights, the weights having different values depending on the set of input features. As previously disclosed, online learner 304 may utilize a logistic regression to calculate the array weights returned to recommendation engine 112.

At Step 408, recommendation engine 112 calculates an expected value for the candidate object. In particular embodiments, the expected value may be represented as $C1*CTR+C2*Conversion\_rate$, where the constants are predetermined values. This disclosure contemplates any suitable method of calculating an expected value for a particular user and content object. At Step 409, recommendation engine determines whether it has calculated expected values for all the candidate objects returned from recommendation candidate index 301 in Step 403. If so, the process continues to Step 410; if not, the process repeats for the next candidate object in the queue.

At Step 410, recommendation engine 112 ranks all the candidate objects, and renders a predetermined number of the candidate objects having the highest expected value to the user. In particular embodiments, the highest ranked candidate objects may be displayed on the right hand column of a profile page. In particular embodiments, they may be displayed on another area of the user display. In particular embodiments, recommendation engine 112 may be an application that communicates via an application user interface of a social plug-in that resides on a third-party website.

Figure 5:
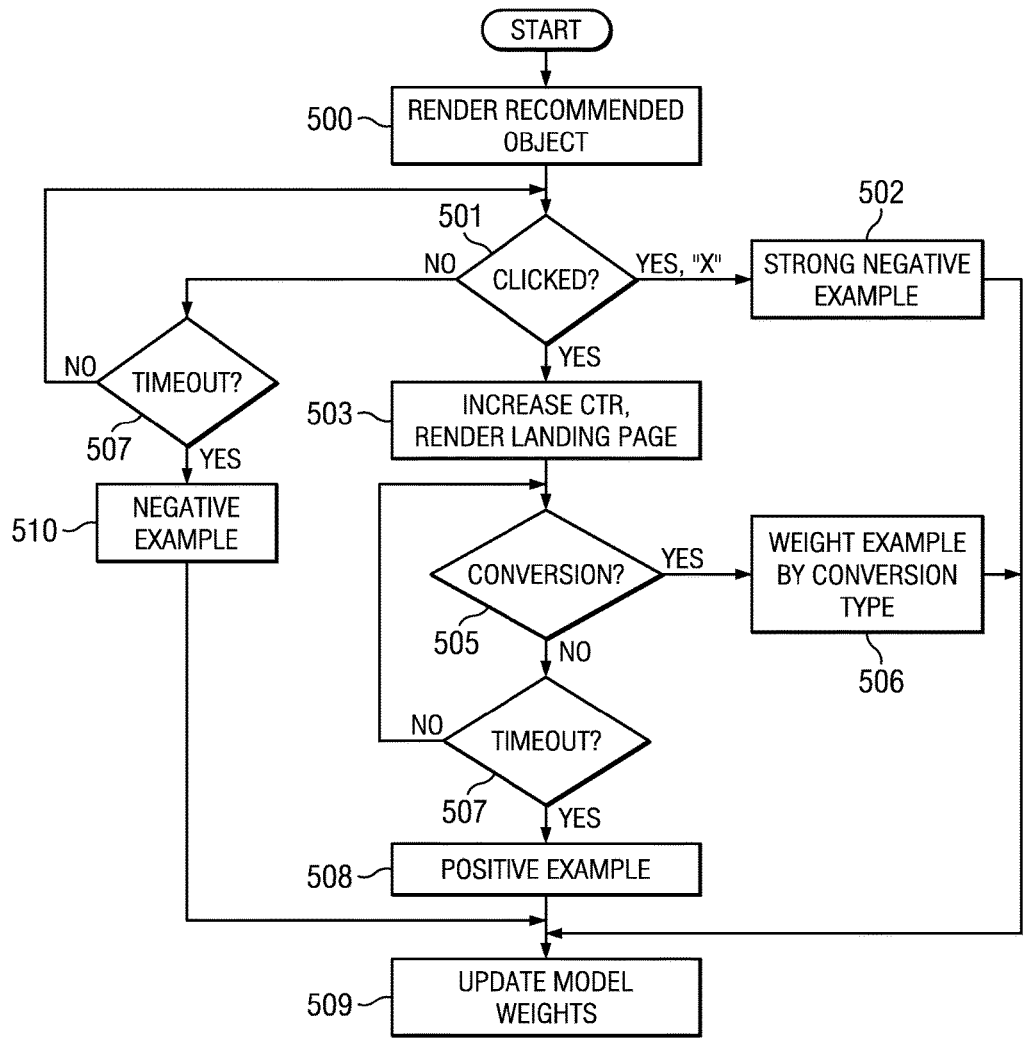
FIG. 5 illustrates an example method for updating a model for an online learner.

FIG. 5 illustrates an example to update weights of the model in online learner 304 in response to user clicks or conversions. Because of the large number of impressions and user interactions with recommended objects in social networking system 100, it is imperative that the model generated by online learner 304 stay up to date in substantially real time in order to reflect habits or preferences of users of the social networking system.

At Step 500, a particular content object is rendered on the display of a particular user. Online learner 304 begins logging the user's activity and interactions with the rendered content object for a predetermined amount of time. In particular embodiments, a timeout timer is started upon rendering the content object to the user, also called "registering an impression."

At Step 501, online learner 304 waits for the user to click on the particular content object. If no click is received and the timeout timer expires at the end of the predetermined interval, the process assumes the particular content object was not interesting to the user, and registers the impression as a negative example in Step 510. In particular embodiments, the predetermined interval is 15 minutes. this disclosure contemplates a timeout period of any arbitrary duration.

Similarly, in particular embodiments at Step 501, if the users clicks an "X" icon in the content object, indicating that the user no longer wants to see the content object or similar content objects, online learner 304 may register this as a highly negative example, and proceed to Step 502. In particular embodiments, hiding, closing, or "x-ing out" a content object is weighted as a more negative example than merely not interacting with the content object. In particular embodiments, this signal does not affect the model weights. This disclosure contemplates any suitable weighting of a "hide" command relative to a timeout without clicking the content object.

At Step 501, if the user clicks on the content object but does not "x-out" the content object, online learner 304 considers the interaction a "positive click" and increments the CTR of the content object at Step 503. Additionally, after a user clicks on a recommended content object, web server 101 renders the landing page of the object. The landing page for a given object may vary depending on the type of object. For example, when a user clicks another user who is a friend, the landing page is the other user's profile. As another example, when a user clicks another user who is not a friend, the landing page is the other user's public search page. As another example, when a user clicks an event object, the landing page is the event page. This disclosure contemplates any suitable landing page for any suitable content object.

At Step 505, online learner 505 determines whether the user converted on the object. For the purposes of this application, "converting" upon a content object means clicking on an element of its landing page. The content of each landing page is also different for each content object. For example, where a landing page is a user profile who is not friends with the viewing user, the selectable elements may be, in particular embodiments, adding the user as a friend, messaging the user, and "poking" the user. As another example, if the landing page is an event page, the selectable elements may be to RSVP to the event, invite other guests to the event, or view the guestlist. This disclosure contemplates any suitable user-selectable elements in the landing pages of any suitable content object.

If the user converts on the content object by clicking an element of in the landing page of the content object, online learner 304 proceeds to Step 506. At Step 506, the weight of the positive example is altered depending on the type of conversion type. For example, if the landing page is the public search profile of a non-friend user, online learner 304 may consider sending a friend request to be a strong positive example, sending a message to be a slightly less strong positive example, and poking the user as merely a strong positive example (though higher than merely clicking on the content object). As another example, RSVPing to an event may be a strong positive conversion, whereas writing on the wall of the event may be a slightly weaker positive conversion, and viewing the guestlist may be considered a weak positive conversion. In particular embodiments, the relative strength of the various conversions and the assignment of weights to the different actions are predetermined by social networking system 100. This disclosure contemplates any suitable weight assignment.

If the user clicks on the content object at Step 501, but does not further convert on the content object within the timeout period, online learner at Step 508 rates the interaction as a positive example. In particular embodiments, the strength of the positive example is lower than any user interactions that involve the initial click and a conversion as described above.

At Step 509, online learner updates the weights in the model. As previously described, the model weights may be obtained through logistic regression, and the positive or negative example may fed into the model as another data point. Because online learner 304 is aware of the user features for the user interacting with the content object, as well as the content features, the data point fed into online learner 304 can accurately encapsulate any correlative or casual relationships between the user and the content object. As previously disclosed, this disclosure contemplates any suitable regression analysis.

Figure 6:
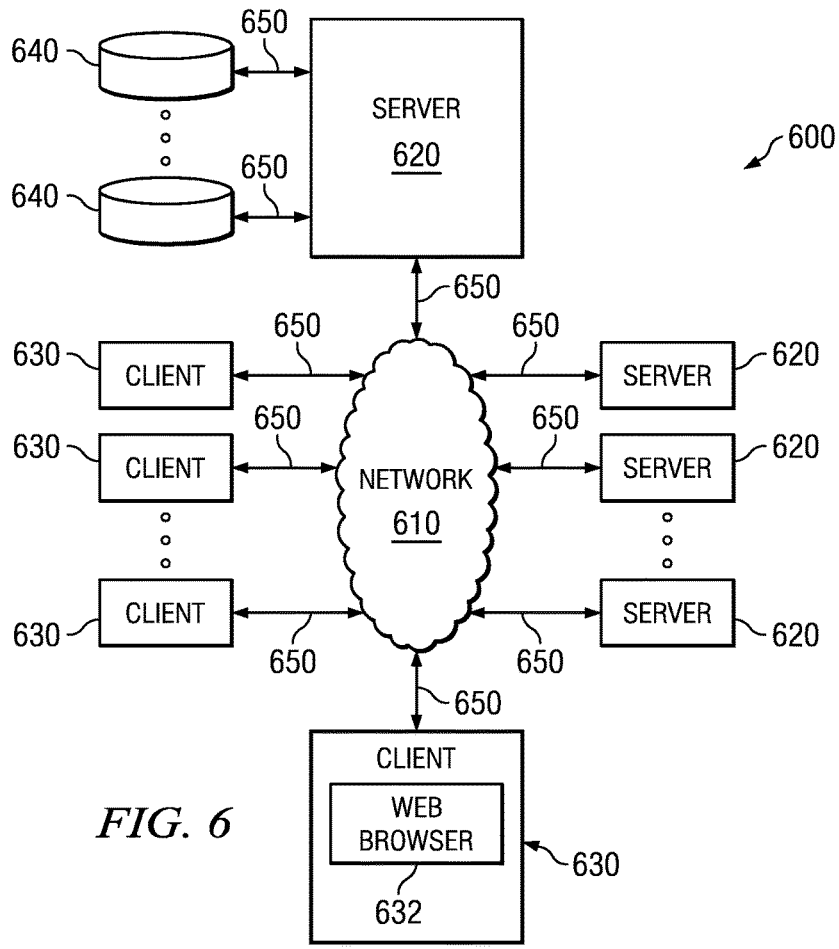
FIG. 6 illustrates an example network environment.

While the foregoing embodiments may be implemented in a variety of network configurations, the following illustrates an example network environment for didactic, and not limiting, purposes. FIG. 6 illustrates an example network environment 600. Network environment 600 includes a network 610 coupling one or more servers 620 and one or more clients 630 to each other. Network environment 600 also includes one or more data storage 640 linked to one or more servers 620. Particular embodiments may be implemented in network environment 600. For example, social networking system frontend 120 may be written in software programs hosted by one or more servers 620. For example, event database 102 may be stored in one or more storage 640. In particular embodiments, network 610 is an intranet, an extranet, a virtual private network (VPN), a local area network (LAN), a wireless LAN (WLAN), a wide area network (WAN), a metropolitan area network (MAN), a portion of the Internet, or another network 610 or a combination of two or more such networks 610. This disclosure contemplates any suitable network 610.

One or more links 650 couple a server 620 or a client 630 to network 610. In particular embodiments, one or more links 650 each includes one or more wired, wireless, or optical links 650. In particular embodiments, one or more links 650 each includes an intranet, an extranet, a VPN, a LAN, a WLAN, a WAN, a MAN, a portion of the Internet, or another link 650 or a combination of two or more such links 650. This disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, one or more data storages 640 may be communicatively linked to one or more servers 620 via one or more links 650. In particular embodiments, data storages 640 may be used to store various types of information. In particular embodiments, the information stored in data storages 640 may be organized according to specific data structures. In particular embodiment, each data storage 640 may be a relational database. Particular embodiments may provide interfaces that enable servers 620 or clients 630 to manage, e.g., retrieve, modify, add, or delete, the information stored in data storage 640.

In particular embodiments, each client 630 may be an electronic device including hardware, software, or embedded logic components or a combination of two or more such components and capable of carrying out the appropriate functions implemented or supported by client 630. For example and without limitation, a client 630 may be a desktop computer system, a notebook computer system, a netbook computer system, a handheld electronic device, or a mobile telephone. This disclosure contemplates any suitable clients 630. A client 630 may enable a network user at client 630 to access network 630. A client 630 may enable its user to communicate with other users at other clients 630.

A client 630 may have a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 630 may enter a Uniform Resource Locator (URL) or other address directing the web browser 632 to a server 620, and the web browser 632 may generate a Hyper Text Transfer Protocol (HTTP) request and communicate the HTTP request to server 620. Server 620 may accept the HTTP request and communicate to client 630 one or more Hyper Text Markup Language (HTML) files responsive to the HTTP request. Client 630 may render a web page based on the HTML files from server 620 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 7:
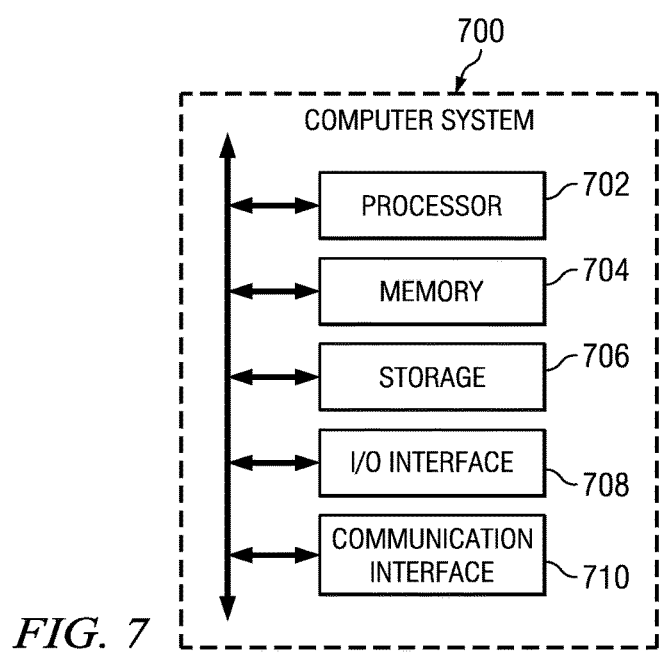
FIG. 7 illustrates an example computer system architecture.

FIG. 7 illustrates an example computing system architecture, which may be used to implement a server. In one embodiment, hardware system 700 comprises a processor 702, a cache memory 704, and one or more executable modules and drivers, stored on a tangible computer readable medium, directed to the functions described herein. Additionally, hardware system 700 includes a high performance input/output (I/O) bus 706 and a standard I/O bus 708. A host bridge 708 couples processor 702 to high performance I/O bus 706, whereas I/O bus bridge 712 couples the two buses 706 and 708 to each other. A system memory 714 and one or more network/communication interfaces 716 couple to bus 706. Hardware system 700 may further include video memory (not shown) and a display device coupled to the video memory. Mass storage 717, and I/O ports 720 couple to bus 708. Hardware system 700 may optionally include a keyboard and pointing device, and a display device (not shown) coupled to bus 708. Collectively, these elements are intended to represent a broad category of computer hardware systems, including but not limited to general purpose computer systems based on the x76-compatible processors manufactured by Intel Corporation of Santa Clara, Calif., and the x76-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 702.3) network, a backplane, etc. Mass storage 717 provides permanent storage for the data and programming instructions to perform the above-described functions implemented in the servers 22a, 22b, whereas system memory 714 (e.g., DRAM) provides temporary storage for the data and programming instructions when executed by processor 702. I/O ports 620 are one or more serial and/or parallel communication ports that provide communication between additional peripheral devices, which may be coupled to hardware system 700.

Hardware system 700 may include a variety of system architectures; and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

In one implementation, the operations of the embodiments described herein are implemented as a series of executable modules run by hardware system 700, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 702. Initially, the series of instructions may be stored on a storage device, such as mass storage 717. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 716. The instructions are copied from the storage device, such as mass storage 717, into memory 714 and then accessed and executed by processor 702.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

This disclosure encompasses all changes, substitutions, variations, alterations, and modifications to the example embodiments herein that a person having ordinary skill in the art would comprehend. By way of example, while embodiments have been described as operating in connection with a social networking website, the disclosure can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method comprising:
by one or more computing devices, receiving a request from a first user for a content page;
by one or more computing devices, determining a page identifier for the requested content page;
by one or more computing devices, determining, based on the page identifier, one or more second users, wherein the one or more second users are identified in the requested content page;
by one or more computing devices, determining a plurality of content items based on one or more of the second users, wherein each of the plurality content items is owned by a second user;
by one or more computing devices, determining one or more user features of the first user;
by one or more computing devices, determining for each of the content items one or more content features;
by one or more computing devices, calculating for each of the content items an expected value of the content item with respect to the first user based on the user features of the first user and the content features of the content item;
by one or more computing devices, ordering the content items by decreasing expected value; and
by one or more computing devices, delivering to the first user, with the requested content page, one or more of the content items as recommendations to the first user based on the ordering of the content items.

2. The method of claim 1, wherein the plurality of content items are determined based on the page identifier.

3. The method of claim 1, wherein the plurality of content items are determined based on a list of one or more services for the content page.

4. The method of claim 1, wherein the user features of the first user comprise an age of the first user.

5. The method of claim 1, wherein the user features of the first user comprise a gender of the first user.

6. The method of claim 1, wherein the user features comprise one or more previous requests for one or more content pages received from the first user.

7. The method of claim 1, wherein, for each of the content items, the content features of the comprise aggregate statistics for the content item based a plurality of users of a social-networking system.

8. The method of claim 7, wherein the aggregate statistics comprise a click-through rate for the content item.

9. The method of claim 7, wherein the aggregate statistics comprise a conversion rate for the content item.

10. The method of claim 7, wherein the aggregate statistics comprise a number of impressions of the content item delivered to the plurality of users during a predetermined period of time.

11. The method of claim 1, wherein the expected values are calculated for each of the content items using a respective recommendation model, wherein the recommendation model comprises a set of weights calculated for the first user using one or more statistical models based on the user features of the first user and the object content features of the content item.

12. The method of claim 11, wherein the one or more statistical models comprises logistic regression.

13. The method of claim 11, further comprising:
by one or more computing devices, generating an example data point, wherein the data point comprises one of a positive example or a negative example for the user features of the first user and the content features of the content item; and
by one or more computing devices, updating the set of weights of the respective recommendation model based on the example data point.

14. The method of claim 13, wherein:
the example data point is a positive example when a viewing user having the user features of the first user fails to convert on a viewed content item having the content features of the content item after an impression; and
the example data point is a negative example when the viewing user having the user features of the first user converts on the viewed content item having the content features of the content item after the impression.

15. The method of claim 14, wherein the viewing user converts on the viewed content item by clicking on a link displayed in a landing page corresponding to the viewed content item.

16. A non-transitory, computer-readable media comprising instructions operable, when executed by one or more computing systems, to:
receive a request from a first user for a content page;
determine a page identifier for the requested content page;
determine, based on the page identifier, one or more second users, wherein the one or more second users are identified in the requested content page;
determine a plurality of content items based on one or more of the second users, wherein each of the plurality content items is owned by a second user;
determine user features of the first user;
determine for each of the content items one or more content features;
calculate for each of the content items an expected value of the content item with respect to the first user based on the user features of the first user and the content features of the item;
order the content items by decreasing expected value; and
deliver to the first user, with the requested content page, one or more of the content items as recommendations to the first user based on the ordering of the content items.

17. The media of claim 16, wherein the plurality of content items are determined based on the page identifier.

18. The media of claim 16, the instructions further operable, when executed by one or more computing systems, to:
calculate for each of the content items the expected values using a respective recommendation model, wherein the recommendation model comprises a set of weights calculated for the first user using one or more statistical models based on the user features of the first user and the content features of the content item;
generate an example data point, wherein the data point comprises one of a positive example or a negative example for the user features of the first user and the content features of the content item; and
update the set of weights of the respective recommendation model based on the example data point.

19. The media of claim 18, wherein:
the example date point is a positive example when a viewing user having the user features of the first user fails to convert on a viewed content item having the content features of the content item after an impression; and
the example date point is a negative example when the viewing user having the user features of the first user converts on the viewed content item having the content features of the content item after the impression.

* * * * *